(12) United States Patent
Ogawa (10) Patent No.: US 7,036,942 B2
(45) Date of Patent: May 2, 2006

(54) OPTICAL FILTER, OPTICAL DEVICE, AND PROJECTOR

(75) Inventor: Yasunori Ogawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 10/614,127

(22) Filed: Jul. 8, 2003

(65) Prior Publication Data

US 2004/0057116 A1 Mar. 25, 2004

(30) Foreign Application Priority Data

Jul. 9, 2002 (JP) .............................. 2002-199633

(51) Int. Cl.
*G03B 21/14* (2006.01)
*G02B 1/00* (2006.01)

(52) U.S. Cl. .......................... 353/122; 353/84; 353/70; 359/586

(58) Field of Classification Search .................. 353/31, 353/33, 34, 37, 84, 122, 70, 38; 349/5, 7, 349/18; 359/586, 580, 587, 890; 362/307, 362/308, 309, 331
See application file for complete search history.

(56) References Cited

U.S. PATENT DOCUMENTS

| | | | |
|---|---|---|---|
| 4,957,371 A * | 9/1990 | Pellicori et al. ............. 356/419 |
| 5,973,759 A * | 10/1999 | Itoh et al. ........................ 349/5 |
| 5,982,541 A * | 11/1999 | Li et al. ....................... 359/497 |
| 6,011,652 A * | 1/2000 | Cushing ....................... 359/588 |
| 6,249,378 B1 * | 6/2001 | Shimamura et al. ......... 359/487 |
| 6,280,035 B1 * | 8/2001 | Tadic-Galeb et al. .......... 353/31 |
| 6,340,230 B1 * | 1/2002 | Bryars et al. ................. 353/31 |
| 6,697,195 B1 * | 2/2004 | Weber et al. ................ 359/359 |
| 6,786,604 B1 * | 9/2004 | Aastuen et al. ................ 353/20 |
| 6,809,859 B1 * | 10/2004 | Erdogan et al. ............. 359/359 |
| 2005/0110999 A1 * | 5/2005 | Erdogan et al. ............. 356/417 |

FOREIGN PATENT DOCUMENTS

JP A-8-304739 11/1996

* cited by examiner

*Primary Examiner*—William C. Dowling
(74) *Attorney, Agent, or Firm*—Oliff & Berridge, PLC (57) ABSTRACT

The invention provides an optical filter, an optical device, and a projector, which make it possible to project a high-quality image by reducing or preventing color unevenness of the projected image. An optical filter is used in a projector that includes liquid crystal panels to modulate light beams from a light source (lamp) in accordance with image information to form optical images. The optical filter is disposed downstream from the liquid crystal panels in a light path, and includes a substrate and an optical conversion film. The optical conversion film is disposed on a light-incident surface of the substrate and includes two types of thin films having different refractive indices and being alternately stacked. The optical conversion film becomes continuously thinner from one end to the other end of the optical conversion film, so that it is inclined with respect to the substrate. Since the optical conversion film becomes continuously thinner, it is possible to project a high-quality image by reducing or preventing color unevenness of the projected image.

11 Claims, 10 Drawing Sheets

OPTICAL FILTER, OPTICAL DEVICE, AND PROJECTOR

BACKGROUND OF THE INVENTION

1. Field of Invention

The present invention relates to an optical filter, an optical device, and a projector.

2. Description of Related Art

Related art projectors have been used in presentations and in home theaters. A related art projector enhances image quality. This projector includes a color separating optical device to separate light beams from a light source into a plurality of types of colored light beams; three light modulators, such as liquid crystal panels, to modulate each separated colored light beam in accordance with image information; a color synthesizing optical device, such as a prism, to synthesize the colored light beams modulated by the light modulators and allow the synthesized colored light beam to exit therefrom; and a projection optical system to enlarge and project the synthesized colored light beam.

Since such a projector is used by placing it on a desk or a table, to make viewing easier, the projector is constructed to perform what is called "tilting-and-shifting projection" in which a projection area is displaced slightly upward from the optical axis of the projection optical system. The "tilting-and-shifting projection" can be achieved by displacing the central axis of a light-beam-exiting end of the color synthesizing optical device downward, which is in a direction opposite to the tilting-and-shifting direction, from the optical axis of the projection optical system.

When a related projector is used as a data projector to project an image based on RGB signals from a computer, the related projector uses a light source having a spectrum with high luminance in the wavelength range of green light (500 nm to 570 nm) for the purpose of providing a sufficiently bright projected image.

SUMMARY OF THE INVENTION

However, when an attempt is made to project an image based on a video signal (composite signal or component signal) using a projector that uses such a light source, since the wavelength range of green light appears intense, for example, a portion of the projected image that is supposed to be white appears greenish white. To address or overcome this problem, in the related art, a correction to reduce the wavelength range of green light (500 nm to 570 nm) to approximately 70% is carried out by adjusting the level of video signals, supplied to the liquid crystal panels, based on an electric circuit. However, in this case, contrast of the projected image is reduced by nearly 30% due to a reduction in the dynamic range of the video signals.

To address or overcome this problem, instead of adjusting the level of the video signals based on an electric circuit, a reflective optical filter to reduce light beams having wavelengths in such a wavelength range may be disposed downstream from the projection optical system in a light path. Such an optical filter includes an optical conversion film having many layers of films of predetermined thicknesses that are formed on a flat glass substrate, and that reflects 30% of the light beams having wavelengths in the aforementioned wavelength range. By this, it is possible to produce a sharp projected image by preventing a reduction in contrast of the projected image that is formed based on the video signals.

However, in the reflective optical filter described above, since the reflection characteristic depends on the angle of incidence of light incident upon the optical filter, the color of the projected image may be uneven.

The present invention provides an optical filter, an optical device, and a projector, which make it possible to project a high-quality image by reducing or preventing color unevenness of the projected image.

An optical filter of the present invention is used in an optical apparatus including a light modulator to modulate light beams from a light source in accordance with image information to form an optical image, and is disposed downstream from the light modulator in a light path. The optical filter includes a substrate, and an optical conversion film. The optical conversion film is disposed on a light-incident surface of the substrate, includes thin films of two types having different refractive indices and being alternately stacked, and is inclined with respect to the substrate by being continuously thinner from one end to the other end.

One of the two types of thin films may be formed of tantalum pentoxide ($Ta_2O_5$), and the other may be formed of silicon dioxide ($SiO_2$).

One of the two types of thin films may be formed of zirconium dioxide ($ZrO_2$), and the other may be formed of silicon dioxide ($SiO_2$).

The optical conversion film may include the aforementioned two types of thin films that are alternately disposed in, for example, 8 or 12 layers. In this case, the thickness of each layer and the number of layers to be stacked may be changed when necessary in accordance with the degree of adjustment in color tone.

When the optical conversion film becomes continuously thinner, the optical conversion film has a continuously changing film thickness so that the reflection characteristic changes in accordance with the incident angle distribution of light beams incident upon the optical filter.

Examples of image information signals are video signals and RGB signals from a computer. The light source used may be one having a spectrum that is intense in the wavelength range of from 500 nm to 570 nm, such as a metal halide lamp. The position of the thick portion of the optical filter with respect to the light modulator is not particularly limited.

According to the present invention, the entire optical filter is given a uniform reflection characteristic by making the optical conversion film incline with respect to the substrate as a result of making the optical conversion film continuously thinner from one end to the other end in accordance with the incident angle distribution of light incident upon the optical filter. Therefore, it is possible to project a high-quality image by reducing or preventing color unevenness of the projected image.

It is desirable to dispose a retardation film adjacent to a light-incident surface of the optical filter. For the retardation film, a $\lambda/4$ plate (¼ wavelength plate) may be desirably used.

Here, for example, in a general liquid crystal projector, polarizers, serving as polarizing devices or photo-analyzers, are disposed upstream and downstream from a liquid crystal panel in a light path, respectively, and a projection optical system is disposed downstream from the polarizers in the light path in order to enlarge and project an image.

In this state, in the case where the optical filter of the present invention is disposed downstream from the projection optical system in the light path, when light beams have impinged upon the liquid crystal panel from the upstream side in the light path, they exit from the liquid crystal panel and pass through the polarizers. The resulting polarized light beams have their phases shifted when they are reflected by the λ/4 plate at the optical filter and the reflected polarized beams are absorbed by one of the polarizers. Therefore, since the light reflected by the optical filter does not travel back to the liquid crystal panel, it is possible to prevent a ghost image from being formed by reflection of such reflected light at the liquid crystal panel.

An optical device of the present invention includes a light modulator to modulate light beams from a light source in accordance with image information to form an optical image; a projection optical system to enlarge and project the optical image formed at the light modulator; and the above-described optical filters. Accordingly, like the above-described optical filters, it is possible to provide a high-quality image by reducing or preventing color unevenness of a projected image.

The projection optical system is used to tilt-and-shift projection in which a central axis of an image-formation area of the light modulator is displaced from an optical axis of the projection optical system, and it is preferable that the optical conversion film may become continuously thinner in a tilting-and-shifting direction.

In the case of such tilting-and-shifting projection, the light beams which have exited from the light modulator and which have been transmitted through a portion, situated at a side opposite to the tilting-and-shifting direction, of the projection optical system impinge upon the optical filter at a large angle due to the projection optical system. The incident light beams having such a large angle of incidence has the most greatly differing reflection characteristics compared to light beams having only a small angle of incidence. Therefore, since the optical filter can use light having a large angle of incidence due to the optical conversion film being continuously thinner in the tilting-and-shifting direction, it is possible to further effectively enhance the quality of a projected image.

It is preferable that an end, disposed in the tilting-and-shifting direction from the optical axis of the projection optical system, of the optical filter is tilted towards the projection optical system.

In this case, since the difference between the angles of incidence at the portions of the optical filter can be reduced by tilting the end, disposed in the tilting-and-shifting direction from the optical axis of the projection optical system, of the optical filter towards the projection optical system, it is possible to more reliably reduce or prevent color unevenness of a projected image.

A projector of the present invention includes the optical filter or optical device. Therefore, the projector can provide substantially the same advantages as those of the optical filters or optical devices.

DETAILED DESCRIPTION OF PREFERRED EMBODIMENTS

First Exemplary Embodiment

A first exemplary embodiment of the present invention is described below with reference to the relevant drawings.

[1. Significant Structure of Projector]

Figure 1:
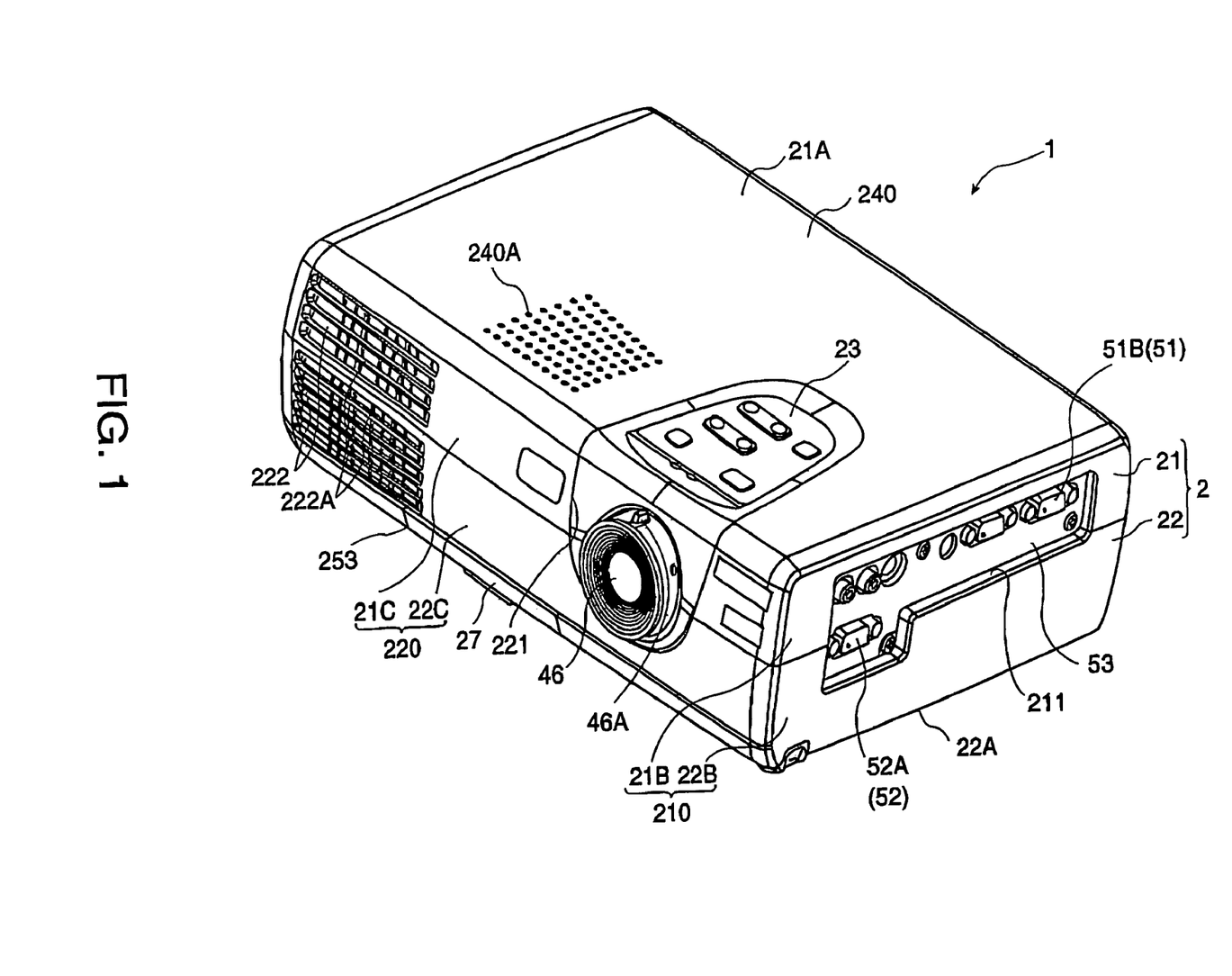
FIG. 1 is a top perspective view of a projector of a first exemplary embodiment of the present invention.
Figure 2:
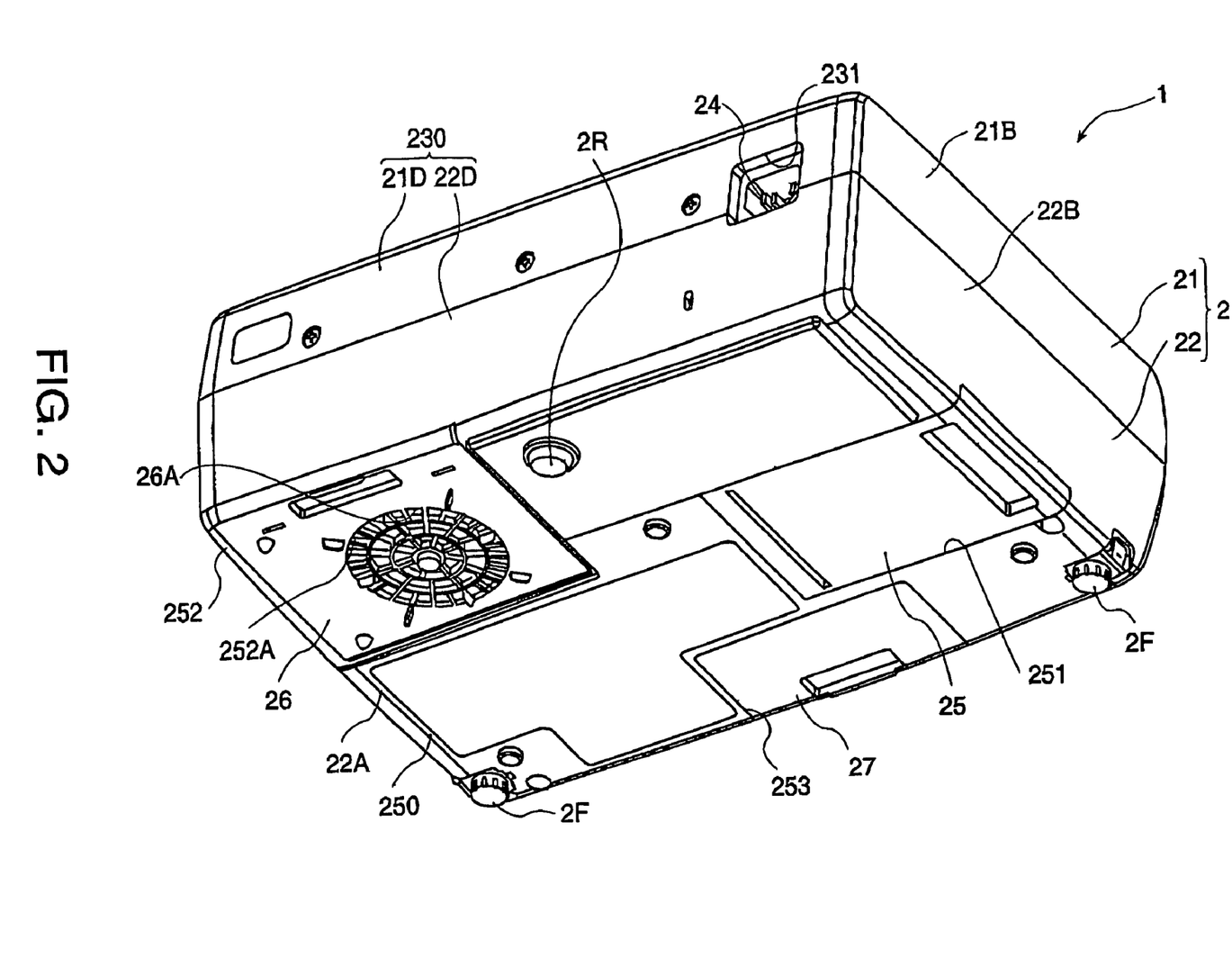
FIG. 2 is a bottom perspective view of the projector.

FIG. 1 is a top perspective view of a projector 1 serving as an optical apparatus of the first exemplary embodiment of the present invention. FIG. 2 is a bottom perspective view of the projector 1.

As shown in FIGS. 1 and 2, the projector 1 includes a substantially rectangular parallelepiped external case unit 2 formed by injection molding. The external case unit 2 is a housing which is formed of synthetic resin and which accommodates the body of the projector 1, and includes an upper case 21 and a lower case 22. The cases 21 and 22 are removably formed.

As shown in FIGS. 1 and 2, the upper case 21 includes a top surface 21A, side surfaces 21B, a front surface 21C, and a back surface 21D, each defining the top surface, side surfaces, a front surface, and a back surface of the projector 1.

Similarly, as shown in FIGS. 1 and 2, the lower case 22 includes a bottom surface 22A, side surfaces 22B, a front surface 22C, and a back surface 22D, each defining the bottom surface, side surfaces, a front surface, and a back surface of the projector 1.

Therefore, as shown in FIGS. 1 and 2, in the rectangular parallelepiped external case unit 2, the side surfaces 21B and the side surfaces 22B of the respective upper case 21 and lower case 22 are continuously joined, so that rectangular parallelepiped side portions 210 are formed. Similarly, the front surfaces 21C and 22C are joined, so that a front portion 220 is formed; and the back surfaces 21D and 22D are joined, so that a back portion 230 is formed. The top surface 21A defines a top portion 240, and the bottom surface 22A defines a bottom portion 250.

As shown in FIG. 1, an operation panel 23 is disposed at the forward side of the top portion 240. Speaker holes 240A to output voice are formed near the operation panel 23.

An opening 211 is formed on the two side surfaces 21B and 22B of the side portions 210 (the right side portion 210 as viewed from the front). A main board 51 and an interface board 52 (described later) are disposed in the external case unit 2. Through an interface panel 53 mounted in the opening 211, a connector 51B, mounted to the main board 51, and a connector 52A, mounted to the interface board 52, are exposed to the outside. External electronic devices, etc., are connected to the projector 1 through these connectors 51B and 52A.

A circular opening 221, which is disposed on both the front surfaces 21C and 22C, is formed near the operation panel 23 and on the right side of the front portion 220 as seen from the front.

A projection lens 46, serving as a projection optical system, is disposed in the external case unit 2 at the position corresponding to the opening 221. The front end portion of the projection lens 46 is exposed to the outside from the opening 221. Through a lever 46A, which is a portion of the exposed front end portion, the projection lens 46 can be manually focused.

Exhaust openings 222 are formed in a portion of the front portion 220 at a side opposite to the opening 221. Safety covers 222A are disposed on the exhaust openings 222.

As shown in FIG. 2, a rectangular opening 231 is formed on the back portion 230 on the right side as seen from the back. An inlet connector 24 is exposed from the opening 231.

A rectangular opening 251 is formed in the middle portion of the right side of the bottom portion 250 as seen from the bottom. A lamp cover 25, which covers the opening 251, is removably disposed on the opening 251. By removing the lamp cover 25, a light source (that is, a lamp which is not shown) can be easily replaced.

A rectangular surface 252, which is recessed inward, is formed at a left corner of the back side of the bottom portion 250 as viewed from the bottom. An inlet 252A to suck cooling air from the outside is formed in the rectangular surface 252. An inlet cover 26, which covers the rectangular surface 252, is removably disposed on the rectangular surface 252. An opening 26A, which is in correspondence with the inlet 252A, is formed in the inlet cover 26. An air optical filter (not shown) is disposed at the opening 26A in order to reduce or prevent entry of dust into the optical filter.

A back foot 2R of the projector 1 is formed at a substantially middle portion of the back side of the bottom portion 250. Similarly, front feet 2F of the projector 1 are formed at the left and right corners of the forward side of the bottom surface 22A. In other words, the projector 1 is supported at three points by the back foot 2R and the two front feet 2F.

The two front feet 2F are formed so as to be movable in the vertical direction, and are used to adjust the forward-and-backward and leftward-and-rightward tilting (posture) of the projector 1 in order to adjust the position of a projected image.

As shown in FIGS. 1 and 2, a rectangular parallelepiped recess 253 is formed in substantially the middle portion of the forward side of the external case unit 2 and at both the bottom portion 250 and the front portion 220. A cover 27, which covers the front and bottom sides of the recess 253 and which can slide forward and backward, is disposed on the recess 253. By the cover 27, a remote controller (not shown) to perform remote control of the projector 1 is accommodated in the recess 253.

Figure 3:
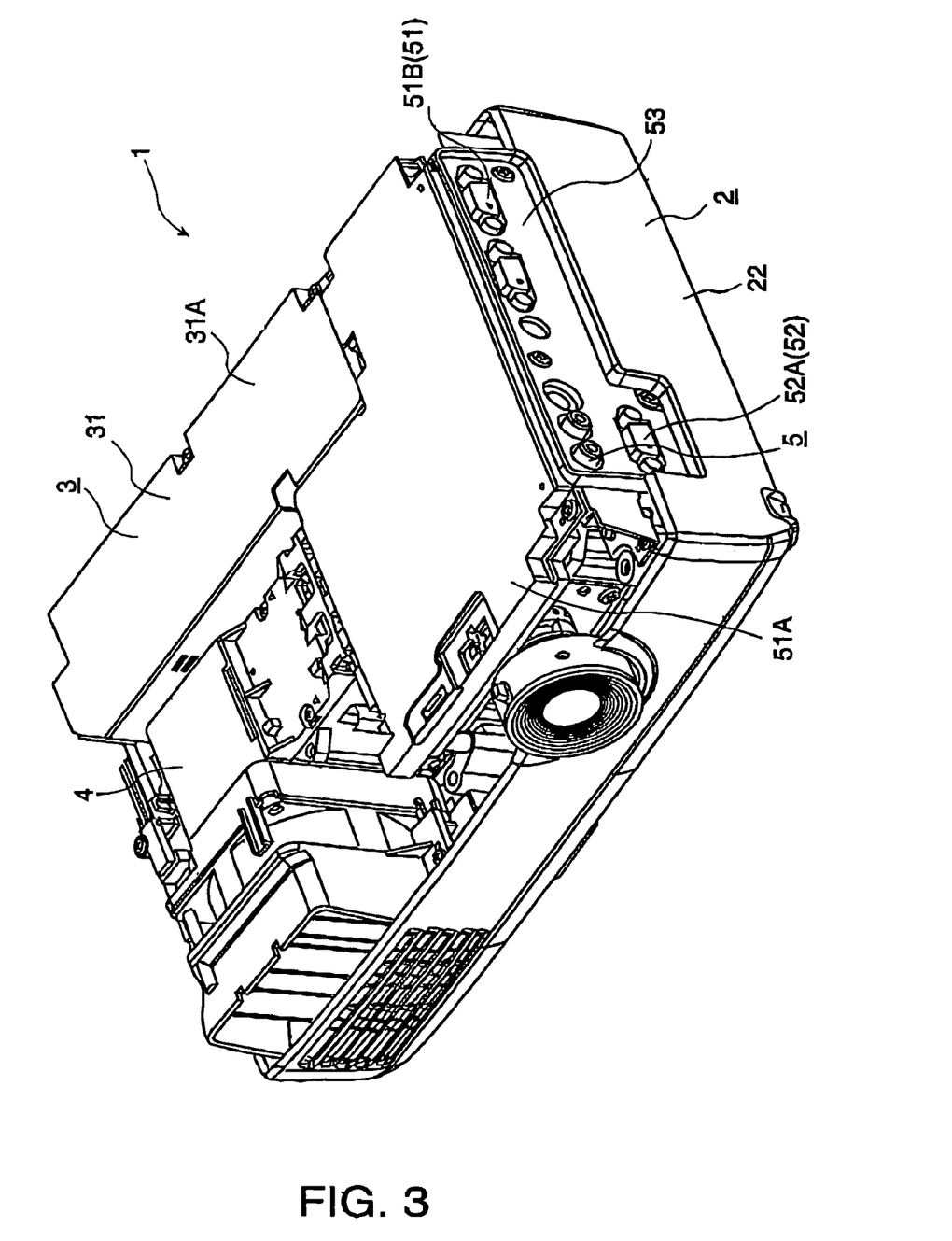
FIG. 3 is a perspective view of the projector resulting from removal of an upper case from the state of the projector shown in FIG. 1.
Figure 4:
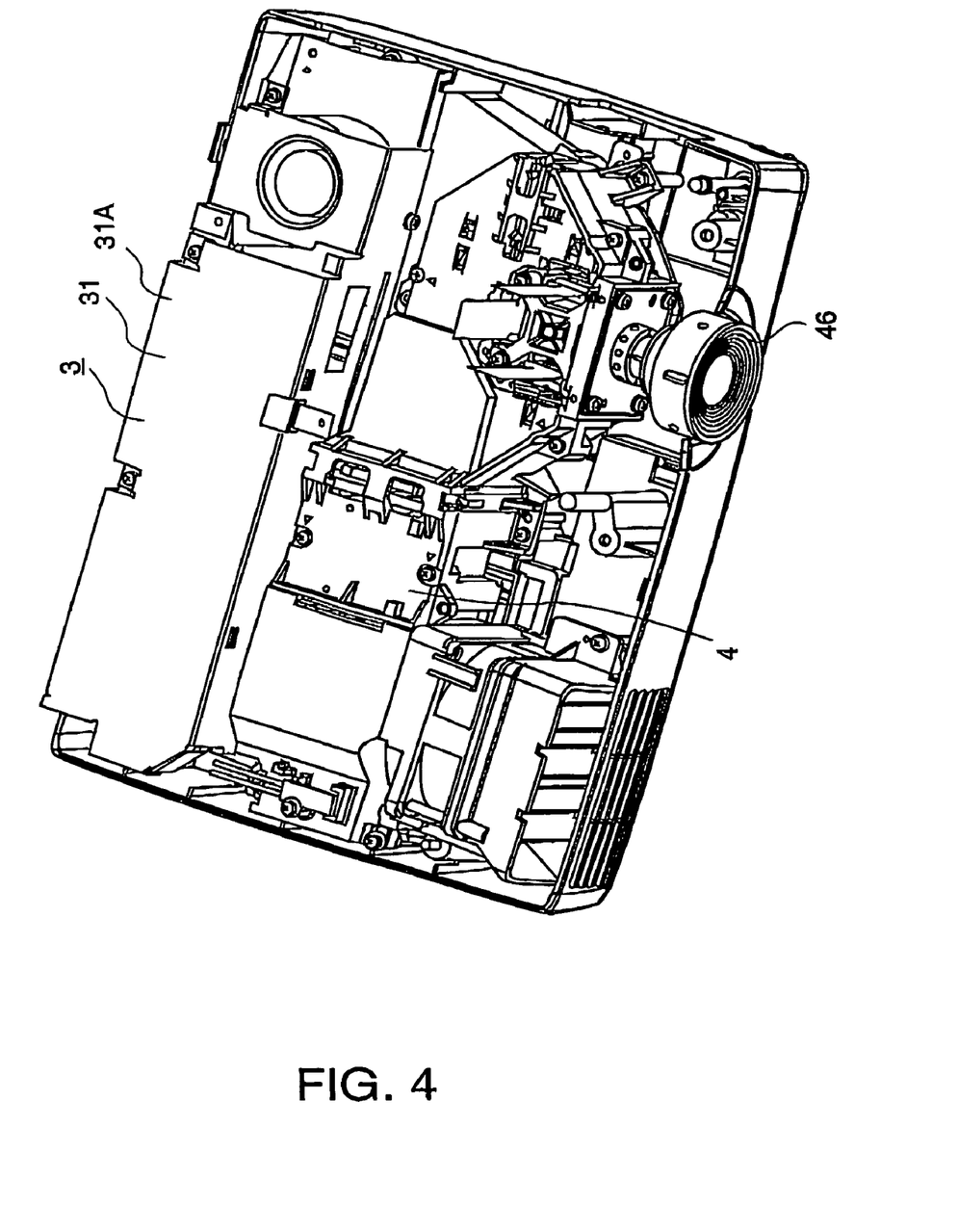
FIG. 4 is a perspective view of the projector resulting from removal of a control substrate from the state of the projector shown in FIG. 3.

FIGS. 3 and 4 are perspective views of the inside of the projector 1. FIG. 3 shows the projector 1 resulting from removal of the upper case 21 from the state of the projector 1 shown in FIG. 1. FIG. 4 shows the projector 1 resulting from removal of a control board 5 from the state of the projector 1 shown in FIG. 3.

As shown in FIGS. 3 and 4, the external case unit 2 has a power supply unit 3, an optical unit 4, and the control board 5 disposed therein. The power supply unit 3 is disposed along the back portion of the external case unit 2 and extends towards the left and right. The optical unit 4, serving as an optical system, is disposed forwardly of the power supply unit 3 and has a substantially L shape in a plan view. The control board 5, serving as a control section, is disposed above and on the right side of the units 3 and 4. By these devices 3 to 5, the body of the projector 1 is formed.

The power supply unit 3 includes a power supply 31 and a lamp drive circuit (ballast), which is not shown, disposed below the power supply 31.

By the power supply 31, electrical power supplied through a power supply cable (not shown), connected to the inlet connector, from the outside is supplied to the lamp drive circuit, the control board 5, etc.

The lamp drive circuit is used to supply electrical power from the power supply 31 to the lamp (not shown in FIGS. 3 and 4) of the optical unit 4, and is electrically connected to the lamp. Such a lamp drive circuit can be formed by, for example, wiring to a substrate.

The power supply 31 and the lamp drive circuit are disposed substantially parallel to each other and vertically in a row. Space occupied by the power supply 31 and the lamp drive circuit extends towards the left and right along the back surface of the projector 1.

The power supply 31 and the lamp drive circuit are covered by a shield 31A formed of metal, such as aluminum, and having left and right openings.

In addition to functioning as a duct for guiding cooling air, the shield 31A functions to reduce or prevent electromagnetic noise, which is generated in the power supply 31 or the lamp drive circuit, from leaking out.

As shown in FIG. 3, the control board 5 includes the main board 51 and the interface board 52. The main board 51 covers the top sides of the units 3 and 4 and has a central processing unit (CPU), the connector 51B, etc. The interface board 52 is disposed below the main board 51 and has the connector 52A.

In the control board 5, the CPU, etc., on the main board 51 controls liquid crystal panels of an optical device (described below) in accordance with image information input through the connectors 51B and 52A. The main board 51 is covered by a metallic shield 51A.

[2. Detailed Structure of Optical Unit]

Figure 5:
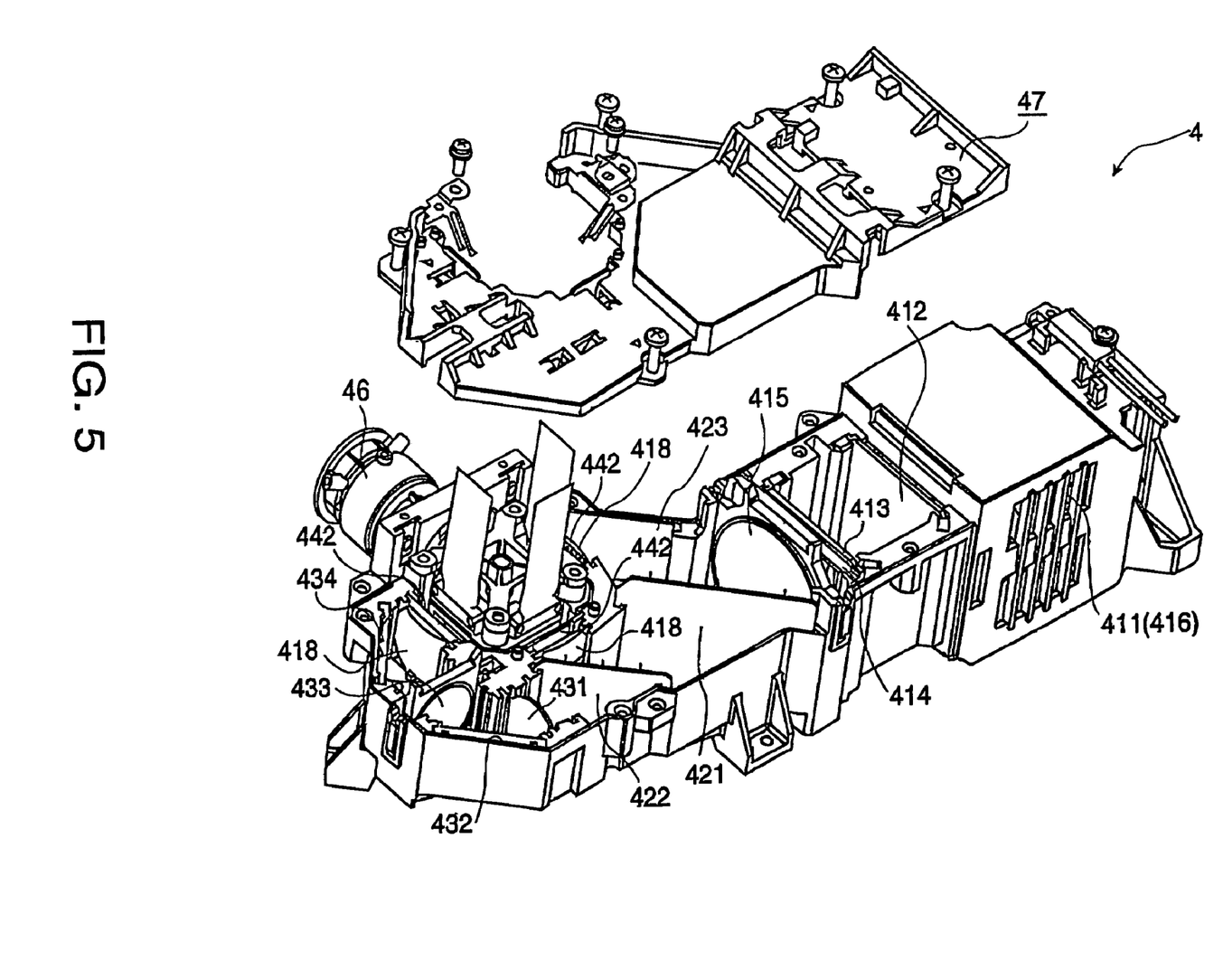
FIG. 5 is an exploded perspective view of an optical unit of the projector.
Figure 6:
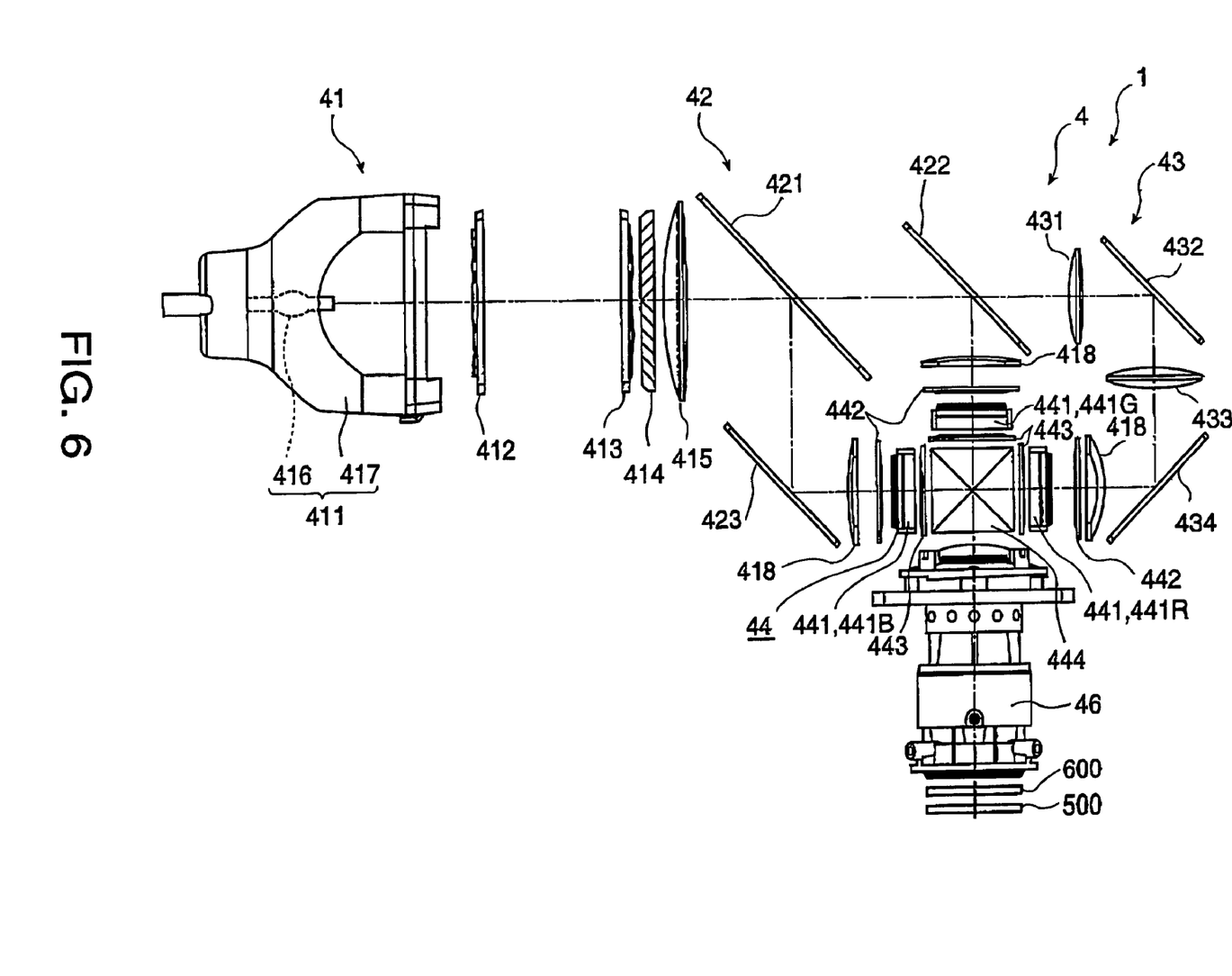
FIG. 6 is a schematic of the optical unit.

FIG. 5 is an exploded perspective view of the optical unit 4. FIG. 6 is a schematic of the optical unit 4.

As shown in FIG. 6, the optical unit 4 optically processes light beams emitted from a light source (lamp) 416 of a light source device 411, forms optical images in accordance with image information, and enlarges and projects the optical images. The optical unit 4 includes an integrator illumination optical system 41, a color separation optical system 42, a relay optical system 43, an optical device body 44, the projection lens 46 serving as a projection optical system, and a light guide 47 (see FIG. 5) formed of synthetic resin and used to accommodate the optical parts 41 to 44 and 46. By the optical device body 44 and the projection lens 46, the optical device recited in the claims is formed.

The integrator illumination optical system 41 substantially uniformly illuminates image-formation areas of three liquid crystal panels 441 (that is, liquid crystal panels 441R, 441G, and 441B of red, green, and blue light, respectively) of the optical device body 44. The integrator illumination optical system 41 comprises the light source device 411, a first lens array 412, a second lens array 413, a polarization conversion element 414, and a superimposing lens 415.

The light source device 411 includes the lamp 416, serving as a radiating light source, and a reflector 417. Radial light rays emitted from the lamp 416 are reflected by the reflector 417 and formed into parallel light rays, which exit from the light source device 411. The lamp 416 is a metal halide lamp, but may also be a high-pressure mercury lamp, a halogen lamp, or the like. Instead of a parabolic reflector, a combination of a paralleled concave lens and an ellipsoidal mirror may be used. The lamp 416 is described in more detail below.

The first lens array 412 includes small lenses having substantially rectangular shapes when viewed in the direction of the optical axis and being disposed in a matrix. Each small lens divides a light beam from the lamp 416 into a plurality of partial light beams. The shape of each small lens is designed to be substantially the same as the shape of the image-formation area of each liquid crystal panel 441. For example, if the aspect ratio (that is, ratio between the horizontal and vertical sizes) of the image-formation area of each liquid crystal panel 441 is 4:3, then, the aspect ratio of each small lens is 4:3.

The second lens array 413 has substantially the same structure as the first lens array 412, in which small lenses are disposed in a matrix. Along with the superimposing lens 415, the second lens array 413 focuses an image formed by each small lens of the first lens array 412 onto the liquid crystal panels 441.

The polarization conversion element 414 is disposed between the second lens array 413 and the superimposing lens 415. Such a polarization conversion element 414 converts the light from the second lens array 413 into polarized light beams of one type in order to use light at the optical device body 44 more efficiently.

More specifically, each partial light beam converted into a polarized light beam of one type by the polarization conversion element 414 is finally substantially superimposed upon each light crystal panel 441 of the optical device body 44 by the superimposing lens 415. In the projector 1 using the liquid crystal panels 441 of a type that modulates polarized light beams, since only one type of polarized light beams can be used, only substantially half of the light beams from the lamp 416, which emits other types of randomly polarized light beams, are used. Therefore, using the polarization conversion element 414, all of the light beams from the lamp 416 are converted into one type of polarized light beams in order to use the light at the optical device body 44 more efficiently. Such a polarization conversion element 414 is disclosed in, for example, Japanese Unexamined Patent Application Publication No. 8-304739.

The color separation optical system 42 includes two dichroic mirrors 421 and 422 and a reflective mirror 423. By the dichroic mirrors 421 and 422, the color separation optical system 42 separates the plurality of partial light beams from the integrator illumination optical system 41 into colored light beams of three colors, red (R), green (G), and blue (B).

The relay optical system 43 includes a light-incident lens 431, a relay lens 433, and reflective mirrors 432 and 434. The relay optical system 43 guides the red light, which is colored light separated by the color separation optical system 42, to the liquid crystal panel 441R.

Of the components of the light beams from the integrator illumination optical system 41, a red-light component and a green-light component are transmitted through the dichroic mirror 421 of the color separation optical system 42 and a blue-light component is reflected by the dichroic mirror 421. The blue light reflected by the dichroic mirror 421 is reflected by the reflective mirror 423, is transmitted through a field lens 418, and reaches the liquid crystal panel 441B for blue light. The field lens 418 converts partial light beams from the second lens array 413 into light beams parallel to the central axis thereof (chief ray). Field lenses 418 disposed at the light-incident sides of the other liquid crystal panels 441G and 441R function in a similar way.

Of the red light and green light transmitted through the dichroic mirror 421, the green light is reflected by the dichroic mirror 422, is transmitted through the field lens 418, and reaches the liquid crystal panel 441G for green light. The red light is transmitted through the dichroic mirror 422, through the relay optical system 43, and through the field lens 418, and reaches the liquid crystal panel 441R for red light.

Since the path of red light is longer than the paths of the other colored lights, the relay optical system 43 is used for the red light in order to prevent a reduction in the efficiency of utilizing light due to, for example, diffusion thereof. In other words, the relay optical system 43 is provided to transmit the partial light beams incident upon the light-incident lens 431 as they are to the field lens 418. Although the relay optical system 43 is formed to pass red light of the three types of colored light, it is not limited thereto and it may be formed to pass, for example, blue light.

The optical device body 44 forms a color image by modulating the incident light beams in accordance with image information. The optical device body 44 includes three light-incident polarizers 442; the liquid crystal panels 441R, 441G, and 441B; light-exiting polarizers 443; a cross dichroic prism 444; a retardation film ($\lambda/4$ plate) 600; and a reflective optical filter 500. The colored light beams separated by the color separation optical system 42 are incident upon the light-incident polarizers 442. The liquid crystal panels 441R, 441G, and 441B, serving as light modulators, are disposed downstream from the respective light-incident polarizers 442 in a light path. The light-exiting polarizers 443 are disposed downstream from the respective liquid crystal panels 441R, 441G, and 441B in the light path. The cross dichroic prism 444 serves as a color-synthesizing optical device. The retardation film 600 is disposed downstream from the projection lens 46 in the light path. The optical filter 500 is disposed downstream from the retardation film 600 in the light path.

The liquid crystal panels 441R, 441G, and 441B use, for example, polysilicon thin-film transistors (TFTs) as switching elements.

In the optical device body 44, the colored light beams separated by the color separation optical system 42 are modulated by the three liquid crystal panels 441R, 441G, and 441B, the respective light-incident polarizers 442, and the respective light-exiting polarizers 443 in accordance with image information in order to form optical images.

Each light-incident polarizer 442 transmits only polarized light beams of a certain direction among the colored light beams separated by the color separation optical system 42 and absorbs the other polarized light beams. Each light-incident polarizer 442 is a substrate formed of, for example, sapphire glass with a polarizing film bonded thereto. Each polarizing film may be bonded to its associated field lens 418 rather than to the substrate.

The light-exiting polarizers 443 have substantially the same structures as the light-incident polarizers 442. They transmit only polarized light beams of a predetermined direction among the light beams from the liquid crystal panels 441 (441R, 441G, and 441B) and absorb the other light beams. Each polarizing film may be bonded to the cross dichroic prism 444 rather than to a substrate.

The light-incident polarizers 442 and their respective light-exiting polarizers 443 are set so that the directions of their polarization axes are perpendicular to each other.

The cross dichroic prism 444 synthesizes the optical images which have exited from the light-exiting polarizers 443 and which have been modulated in order to form a color image.

The cross dichroic prism 444 comprises a dielectric multilayer film to reflect red light and a dielectric multilayer film to reflect blue light, which are disposed in the form of a substantially X shape along the interfaces of four right-angle prisms. These dielectric multilayer films synthesize the light beams of three colors.

[3. Spectral Characteristics of Lamp]

Figure 7:
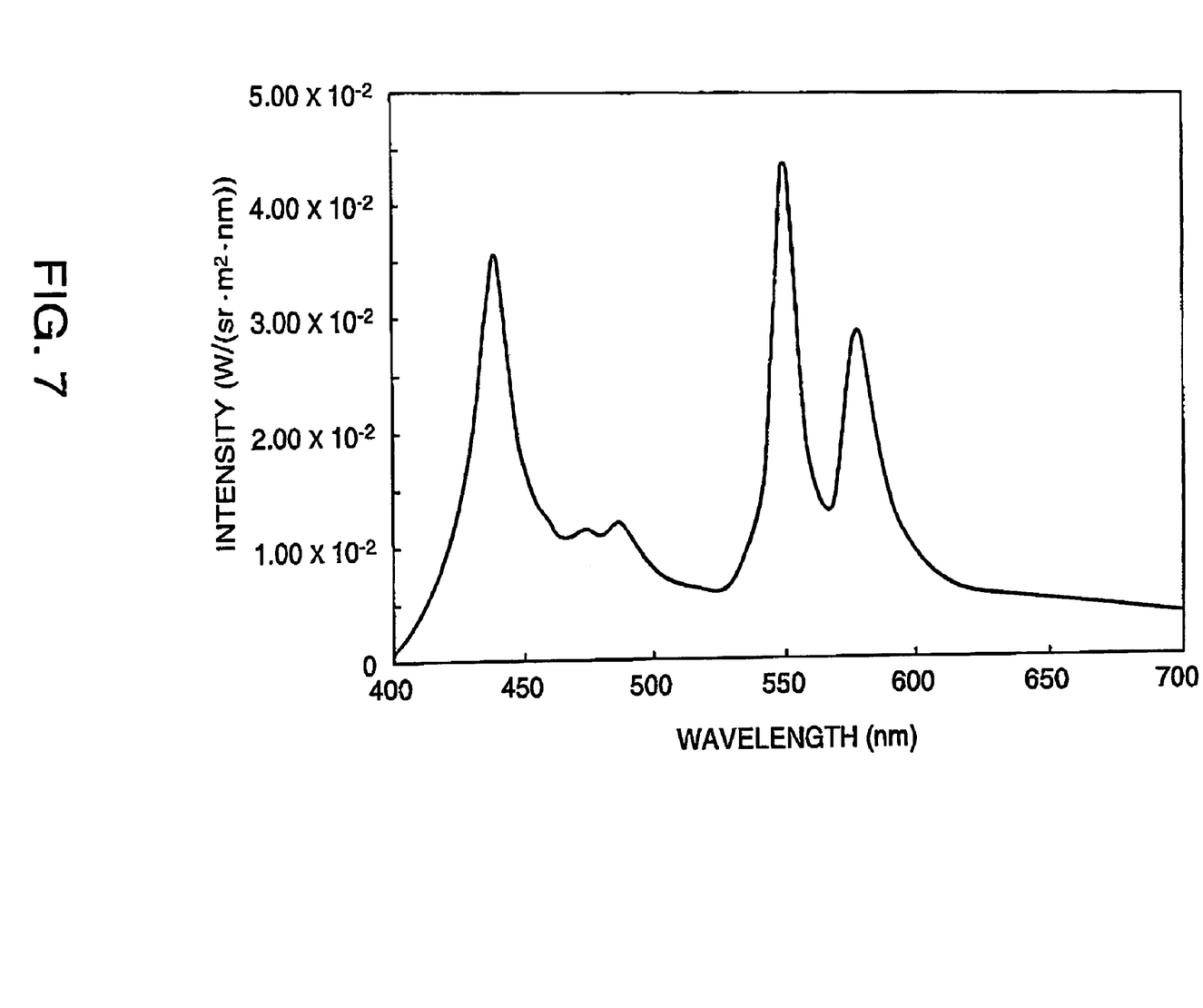
FIG. 7 is a graph showing the spectral characteristics of a light source (lamp) of the projector.

FIG. 7 is a graph showing the spectral characteristics of the lamp 416.

As shown in FIG. 7, a spectral peak value of blue light appears near a wavelength of 440 nm (500 nm to 570 mm); a spectral peak value of green light appears near a wavelength of 550 mm (500 mm to 570 mm); and a spectral peak value of red light appears near a wavelength of 580 nm. The intensity of red light is of the order of approximately 70% of the intensity of green light. The intensity of blue light is of the order of approximately 90% of the intensity of green light.

[4. Structure of Reflective Optical Filter]

Figure 8:
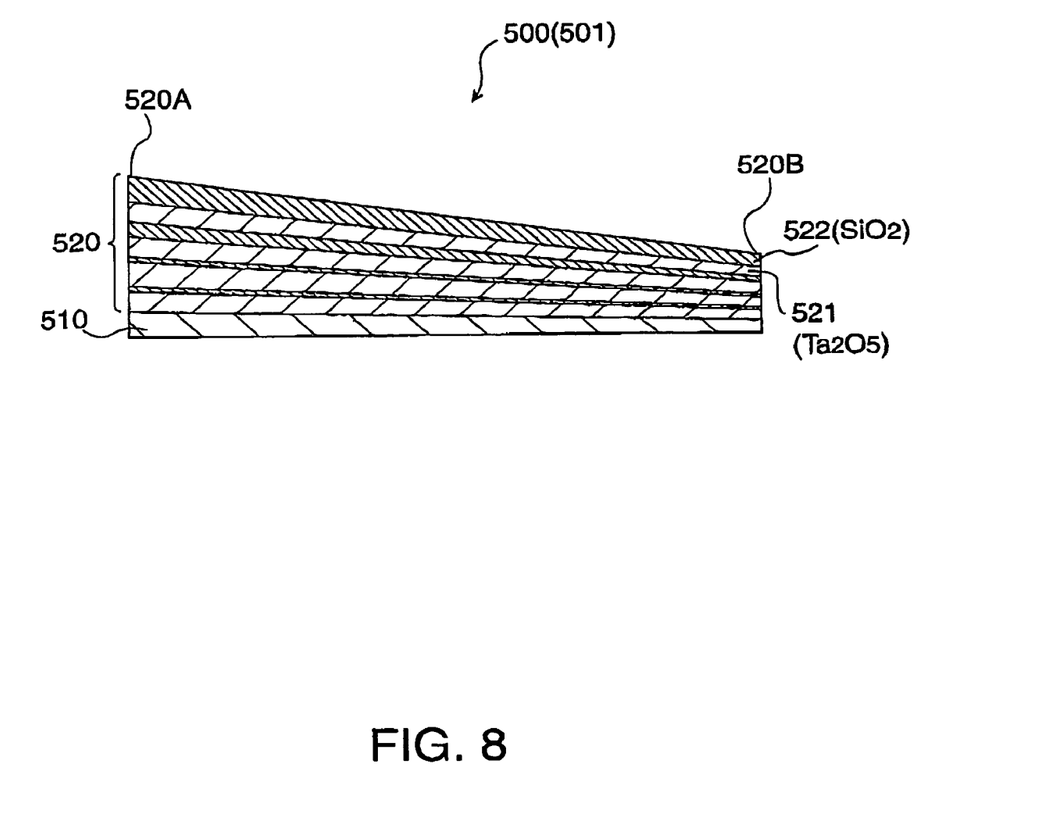
FIG. 8 is a sectional view of a layered structure of a reflective optical filter of the projector.

FIG. 8 is a sectional view of a layered structure of the reflective optical filter 500.

As shown in FIG. 8, the reflective optical filter 500 includes a substrate 510 and a multilayer film 520 serving as an optical conversion film. The substrate is formed of, for example, soda lime glass or white sheet glass. The multilayer film 520 includes two types of thin films having different refractive indices, high-refractive-index layers 521 and low-refractive-index layers 522, which are alternatively stacked upon each other on the glass substrate 510 in eight layers by evaporation or the like. The eighth layer is positioned at the side upon which the light beams from the projection lens 46 impinge. Although not shown in FIG. 8, an anti-reflection film is disposed at the back surface of the glass substrate 510.

Each high-refractive-index layer 521 of the multilayer film 520 is formed of tantalum pentoxide ($Ta_2O_5$). Each low-refractive-index layer 522 is formed of silicon dioxide ($SiO_2$). The first to eighth layers of the multilayer film 520 are formed on the glass substrate 510, and the center thicknesses between 520A and 520B of the multilayer film 520 are as follows. The design wavelength $\lambda$ of light that is reflected is 540 nm.

First layer: tantalum pentoxide layer having a thickness of 0.66$\lambda$ (356.4) nm Second layer: silicon dioxide layer having a thickness of 0.08$\lambda$ (43.2) nm Third layer: tantalum pentoxide layer having a thickness of 0.79$\lambda$ (426.6) nm Fourth layer: silicon dioxide layer having a thickness of 0.12$\lambda$ (64.8) nm Fifth layer: tantalum pentoxide layer having a thickness of 0.76$\lambda$ (410.4) nm Sixth layer: silicon dioxide layer having a thickness of 0.32$\lambda$ (172.8) nm Seventh layer: tantalum pentoxide layer having a thickness of 0.62$\lambda$ (334.8) nm Eighth layer: silicon dioxide layer having a thickness of 0.60$\lambda$ (324.0) nm As shown in FIG. 8, the multilayer film 520 becomes continuously thinner from one end 520A to the other end 520B with the layered structure being unchanged, so that the multilayer film 520 is inclined with respect to the substrate 510.

Figure 9:
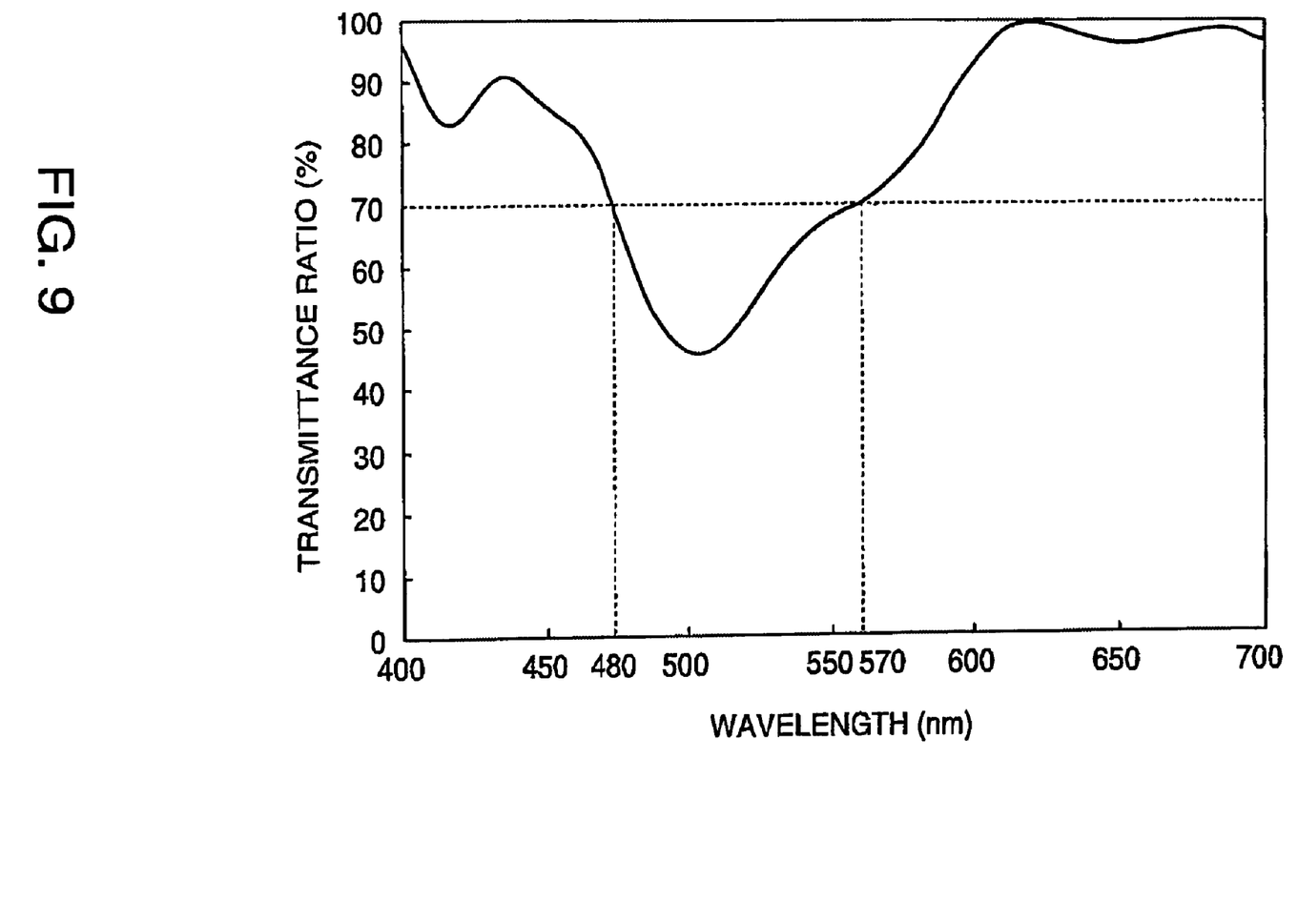
FIG. 9 is a graph showing the transmittance ratio characteristic of the reflective optical filter of the projector.

FIG. 9 is a graph showing the transmittance ratio characteristic of the reflective optical filter 500.

Image light from such a reflective optical filter 500 has the transmittance ratio characteristic shown in FIG. 9. More specifically, the transmittance ratio of light beams having wavelengths in the range of from 500 nm to 570 nm is equal to or less than 70%. That is, 30% or more of the light beams having wavelengths in this range is reflected.

[5. Arrangement of Optical Device and Projection Lens]

Figure 10:
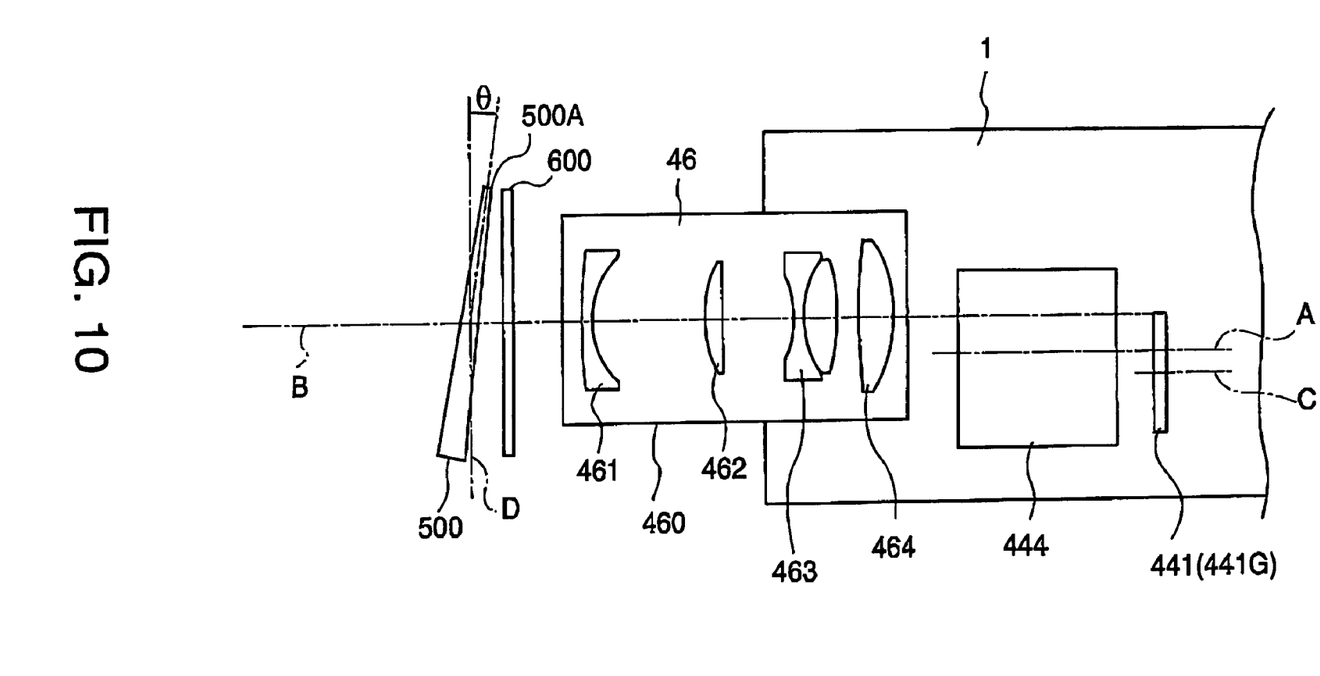
FIG. 10 is a schematic of the arrangement of liquid crystal panels, a cross dichroic prism, a projection lens, a retardation film, and the reflective optical filter of the projector.

FIG. 10 is a schematic of the arrangement of the liquid crystal panel 441 (441G), the cross dichroic prism 444, the projection lens 46, the retardation film 600, and the reflective optical filter 500.

In FIG. 10, the projection lens 46 is used for what is called "tilting-and-shifting projection" in which the central axis of the image formation area of the liquid crystal panel 441 is displaced from the optical axis of the projection lens 46. A central axis A of a light-exiting end surface of the cross dichroic prism 444 is displaced from an optical axis B of the projection lens 46 downward in a direction opposite to a tilting-and-shifting direction (upward in FIG. 10).

The central axis A for light beams incident upon the light-incident surface of the cross dichroic prism 444 is displaced in the tilting-and-shifting direction from a central axis C for light beams incident upon the image-formation area of the liquid crystal panel 441.

The projection lens 46 comprises a total of four lens units (a total of five lenses), a first lens unit 461, a second lens unit 462, a third lens unit 463, and a fourth lens unit 464, which are disposed on an illumination optical axis of a light path in a lens barrel 460 formed of resin or the like. The third lens unit 463 includes two lenses.

The first lens unit 461 is a concave lens unit including an aspherical lens to enlarge and project an image in the tilting-and-shifting direction. The second lens unit 462 is a convex lens unit for adjusting light beams. The third lens unit 463 is a balsam lens unit including a concave lens 463A and an aspherical lens 463B, disposed at the light-incident side, which are bonded together. The fourth lens unit 464 is a convex lens unit which transmits image light.

The retardation film 600 is disposed between the projection lens 46 and the reflective optical filter 500, and is a ¼ wavelength plate.

The reflective optical filter 500 is disposed so that its multilayer film 520 becomes continuously thinner towards the tilting-and-shifting direction. An edge 500A, disposed in the tilting-and-shifting direction from the optical axis B, of the reflective optical filter 500 is tilted by an angle θ towards the projection lens 46 from an axis parallel to a light transmissive surface of the liquid crystal panel 441, that is, from a vertical axis D extending perpendicular to the optical axis B of the projection lens 46.

By this, the reflective optical filter 500 is formed so that the reflection characteristic changes in accordance with the incident angle distribution of light incident upon the optical filter 500.

A switching operation is carried out based on a signal input to the control board of the projector 1 to determine whether or not to dispose the reflective optical filter 500 downstream from the projection lens 46 in the light path. The switching operation is automatically carried out based on the input signal, but is not limited thereto, so that the switching operation may be carried when setting the quality of a projected image or manually by a user.

In such a projector 1, the light beams from the light source are modulated by the liquid crystal panels 441 in accordance with image information in order to form optical images. The optical images are incident upon the light-incident end surfaces of the cross dichroic prism 444 and are synthesized. The synthesized optical image (synthesized light beam) exits from the light-exiting end surface of the cross dichroic prism 444 and is transmitted through the projection lens 46.

Next, in the projection lens 46, after the synthesized light beam from the cross dichroic prism 444 has impinged upon the fourth lens unit 464, chromatic aberration is corrected by the third lens unit 463, which is a balsam lens unit. Then, the amount of the light is adjusted by the second lens unit 462, after which, while distortion is being corrected by the first lens unit 461 (aspherical lens unit), the light is enlarged and projected in the tilting-and-shifting direction.

Thereafter, image light transmitted through the retardation film 600 is such that 30% of the light beams having wavelengths in the range of from 500 nm to 570 nm is reflected by the reflective optical filter 500, and the remaining 70% and the light beams having wavelengths outside this range are transmitted through the reflective optical filter 500.

Since the light beams transmitted through the reflective optical filter 500 are formed in accordance with the incident-angle distribution of the incident light, they are predetermined light beams unaffected by the portion of the reflective optical filter 500 where they impinge upon.

Therefore, a high-quality projected image without any color unevenness is formed. Some of the light beams reflected by the reflective optical filter 500 return towards the projection lens 46. The phases of the returning light beams are shifted due to the light beams being transmitted through the retardation film 600 twice, and are absorbed by the light-exiting polarizer 443 (see FIG. 6) disposed downstream from the liquid crystal panel 441 in the light path. Therefore, the returning light beams do not impinge upon the image-formation area of the liquid crystal panel 441. The reflected light beams that do not return to the projection lens 46 obviously do not return to the liquid crystal panel 441.

[6. Exemplary Advantages of the First Exemplary Embodiment]

The exemplary embodiment provides the following exemplary advantages.

(1) Since the multilayer film 520 is inclined with respect to the substrate 510 by becoming continuously thinner from the one end 520A to the other end 520B of the multilayer film 520 in accordance with the incident angle distribution of light incident upon the reflective optical filter 500, a uniform reflection characteristic is provided in the entire reflective optical filter 500. Therefore, it is possible to provide a high-quality image by preventing color unevenness of a projected image.

The optical device and projector 1 including such an optical filter 500 can provide a high-quality image without color unevenness.

(2) Since the retardation film 600 is disposed adjacent to the light-incident surface of the reflective optical filter 500, light reflected by the optical filter 500 is absorbed by the light-exiting polarizer 443, so that it does not reach the image-formation area of the liquid crystal panel 441. Therefore, it is possible to reliably prevent a ghost image from being formed due to reflection of such reflected light at the liquid crystal panel 441.

(3) Since the multilayer film 520 becomes continuously thinner towards the tilting-and-shifting direction, it can use incident light having a largest angle of incidence. Therefore, it is possible to further effectively enhance the quality of a projected image.

(4) Since the end 500A, disposed in the tilting-and-shifting direction from the optical axis B, of the reflective optical filter 500 is tilted towards the projection lens 46, differences between angles of incident at the portions of the optical filter 500 can be reduced. Therefore, it is possible to further reliably reduce or prevent color unevenness of a projected image.

(5) Since, in general, the reflective optical filter 500 reflects at least 30% of the incident light having wavelengths in the range of from 500 nm to 570 nm (the wavelength range of green light), the green component of a projected image formed by light beams that have passed through the reflective optical filter 500 is reduced by of the order of 30%. Therefore, the projected image based on video signals can be formed sharp. In particular, pure white light, which is not greenish white light, can be projected. Since it is not necessary to reduce the dynamic range of the video signals supplied to the liquid crystal panels 441, the projected image has sufficient contrast.

(6) By placing the reflective optical filter 500 in and taking it out of the light path, it is possible to use RGB signals input from a computer. Therefore, the color of a projected image can be easily switched in accordance with supplied image information (video signals, RGB signals). Such a switching operation may be carried out either automatically or manually.

Second Exemplary Embodiment

A projector of a second exemplary embodiment of the present invention differs from the projector 1 of the first exemplary embodiment in only the structure of its reflective optical filter. The other structural features are the same. Therefore, descriptions of the features of the layered structure are either omitted or simplified with reference to FIG. 8.

More specifically, a reflective optical filter 501 of the projector of the second exemplary embodiment differs from the reflective optical filter 500 of the first exemplary embodiment in that its high-refractive-index layers 521 is formed of a different material. As shown in FIG. 8, each high-refractive-index layer 521 is formed of zirconium dioxide ($ZrO_2$), and each low-refractive index layer 522 is formed of the same material as each low-refractive index layer 522 of the reflective optical filter 500. As in the first exemplary embodiment, the reflective optical filter 501 is disposed in the projector so that it becomes thinner towards the tilting-and-shifting direction. An end, disposed in the tilting-and-shifting direction from an optical axis B, of the reflective optical filter 501 is tilted towards a projection lens.

The design wavelength $\lambda$ of light that is reflected is 540 nm. More specifically, a multilayer film 520 of the reflective optical filter 501 has the following layers, and the center thicknesses between 520A and 520B of the multilayer film 520 are as follows. In the second exemplary embodiment, the anti-reflective film that is formed at the back surface of the glass substrate 510 in the first embodiment is not formed.

First layer: zirconium dioxide layer having a thickness of 0.66$\lambda$ (356.4) nm Second layer: silicon dioxide layer having a thickness of 0.08$\lambda$ (43.2) nm Third layer: zirconium dioxide layer having a thickness of 0.79λ (426.6) nm Fourth layer: silicon dioxide layer having a thickness of 0.12λ (64.8) nm Fifth layer: zirconium dioxide layer having a thickness of 0.76λ (410.4) nm Sixth layer: silicon dioxide layer having a thickness of 0.32λ (172.8) nm Seventh layer: zirconium dioxide layer having a thickness of 0.62λ (334.8) nm Eighth layer: silicon dioxide layer having a thickness of 0.60λ (324.0) nm The second exemplary embodiment can also provide the same advantages as the exemplary advantages 1 to 6 of the first exemplary embodiment.

[7. Exemplary Modification of the Exemplary Embodiments]

The present invention is not limited to the above-described exemplary embodiments, so that the present invention encompasses modifications, enhancement, improvements, etc., within a scope that makes it possible to realize advantages of the present invention.

For example, although, in the exemplary embodiments, the reflective optical filters 500 and 501 include 8 layers, a reflective optical filter having the following 12 layers may also be used. The reflective optical filter is inclined by becoming continuously thinner as in the exemplary embodiments.

In a multilayer film, each high-refractive-index layer is formed of tantalum pentoxide ($Ta_2O_5$), and each low-refractive-index layer is formed of silicon dioxide ($SiO_2$). The design wavelength λ of light that is reflected is 500 nm. The center thicknesses between 520A and 520B of the multilayer film 520 are as follows.

First layer: tantalum pentoxide layer having a thickness of 0.48λ (240.0) nm

Second layer: silicon dioxide layer having a thickness of 0.58λ (290.0) nm

Third layer: tantalum pentoxide layer having a thickness of 0.13λ (65.0) nm

Fourth layer: silicon dioxide layer having a thickness of 0.10λ (50.0) nm

Fifth layer: tantalum pentoxide layer having a thickness of 0.82λ (410.0) nm

Sixth layer: silicon dioxide layer having a thickness of 0.40λ (200.0) nm

Seventh layer: tantalum pentoxide layer having a thickness of 0.09λ (45.0) nm

Eighth layer: silicon dioxide layer having a thickness of 0.24λ (120.0) nm

Ninth layer: tantalum pentoxide layer having a thickness of 0.88λ (440.0) nm

Tenth layer: silicon dioxide layer having a thickness of 0.12λ (60.0) nm

Eleventh layer: tantalum pentoxide layer having a thickness of 0.07λ (35.0) nm

Twelfth layer: silicon dioxide layer having a thickness of 0.34λ (170.0) nm

Although in each of the exemplary embodiments, a retardation film 600 is disposed between the projection lens 46 and the reflective optical filter 500 or the reflective optical filter 501, it does not need to be specially provided.

Although the top end (which is the end disposed in the tilting-and-shifting direction from the optical axis of the projection lens 46) of the reflective optical filter is tilted towards the projection lens, it only needs to be tilted when necessary.

Although the reflective optical filter is formed so that it becomes continuously thinner towards the tilting-and-shifting direction, it may be formed so that, for example, it becomes continuously thinner towards the left or right. It may also be formed so that it becomes continuously thinner towards the left end and right end, that is, so that the central portion becomes the thickest.

Although the optical filter or optical device is mounted in the projector, they may be mounted in other types of optical apparatuses.

Although a reflective optical filter is used as the optical filter, other types of optical filters, such as an absorption optical filter, may be used. The absorption optical filter may be formed as a glass substrate including an absorbent. In this case, the glass substrate is made thinner from one end to the other end, so that the glass substrate itself is inclined. By this, similarly to the reflective optical filter, it is possible to project a high-quality image by reducing or preventing color unevenness of the projected image.

[Exemplary Advantages]

According to the present invention, it is possible to project a high-quality image by reducing or preventing color unevenness of the projected image.

What is claimed is:

1. An optical device which is used in an optical apparatus that includes a light modulator to modulate light beams from a light source in accordance with image information to form an optical image, and which is disposed downstream from the light modulator in a light path, the optical filter comprising:

a substrate; and an optical conversion film, the optical conversion film being disposed on a light-incident surface of the substrate, the optical conversion film including thin films of two types having different refractive indices and being alternately stacked, and the optical conversion film being inclined with respect to the substrate by being continuously thinner from one end to the other end;

a light source;

a light modulator to modulate light beams from the light source in accordance with image information to form an optical image; and a projection optical system to enlarge and project the optical image formed at the light modulator.

2. The optical device according to claim 1, one of the two types of thin films being formed of tantalum pentoxide, and the other being formed of silicon dioxide.

3. The optical device according to claim 1, one of the two types of thin films being formed of zirconium dioxide, and the other being formed of silicon dioxide.

4. The optical device according to claim 1, further comprising a light-incident surface having a retardation film disposed adjacent thereto.

5. The optical device according to claim 1, the projection optical system being used to tilt-and-shift projection in which a central axis of an image-formation area of the light modulator is displaced from an optical axis of the projection optical system, and the optical conversion film becoming continuously thinner in a tilting-and-shifting direction.

6. The optical device according to claim 5, an end, disposed in the tilting-and-shifting direction from the optical axis of the projection optical system, of the optical filter being tilted towards the projection optical system.

7. A projector, comprising:
the optical device of claim 1.

8. A projector, comprising:
the optical device of claim 5.

9. A projector, comprising:
the optical device of claim 6.

10. An optical device, comprising:
a light source;
a light modulator to modulate light beams from the light source in accordance with image information to form an optical image;
a projection optical system to enlarge and project the optical image formed at the light modulator; and
an optical filter disposed downstream from the light modulator in a light path, the optical filter including:
  a substrate;
  an optical conversion film, the optical conversion film being disposed on a light-incident surface of the substrate, the optical conversion film including thin films of two types having different refractive indices and being alternately stacked, and the optical filter being tilted for an optical axis of the projection optical system; and
the optical conversion film being inclined with respect to the substrate by being continuously thinner from one end to the other end.

11. A projector, comprising:
the optical device of claim 10.

* * * * *